United States Patent [19]

Bickley, Jr. et al.

[11] 4,135,188
[45] Jan. 16, 1979

[54] METHOD AND APPARATUS FOR ORALLY ANNOUNCING VEHICLE SPEED

[76] Inventors: Edgar B. Bickley, Jr., 55 N. River Rd., Apt. #10E, Manchester, N.H. 03105; Thomas H. Harrison, 10101 D. Lake Front Cir., Tampa, Fla. 33612; Ronald K. Haigh, 16 King Richard Dr., Londonderry, N.H. 03053

[21] Appl. No.: 829,533

[22] Filed: Aug. 31, 1977

[51] Int. Cl.² ............................................. G01S 9/44
[52] U.S. Cl. .................................................... 343/8
[58] Field of Search .......................................... 343/8

[56] References Cited

U.S. PATENT DOCUMENTS 3,096,513   7/1963   Cutler ........................... 343/5 GC X Primary Examiner—T.H. Tubbesing
Attorney, Agent, or Firm—Pearson & Pearson

[57] ABSTRACT

Apparatus for orally announcing the speed of a moving vehicle. A radar speed detector produces a multi-digit binary-coded-decimal representation of vehicle speed. These signals are converted to a modulated audio frequency signal that a demodulator, audio amplifier and speaker convert into oral digits for the driver to hear.

7 Claims, 4 Drawing Figures

METHOD AND APPARATUS FOR ORALLY ANNOUNCING VEHICLE SPEED

BACKGROUND OF THE INVENTION

This invention generally relates to the field of vehicle speed sensing using radar speed detectors and more specifically to the generation of an oral announcement of vehicle speed.

There are numerous traffic radar speed detectors manufactured, sold and used throughout the world for the use by police officers in checking vehicle speed on the road in order to assist in enforcing compliance with the speed laws. Originally these radar speed detectors were located in a fixed position in order to measure the speed of oncoming vehicles. In more recent years these detectors have been developed so that they provide an indication of speed whether the police vehicle is moving or not and notwithstanding the direction of vehicle movement. The later type of detector is an example of a so-called "moving radar" detector. These systems visually indicate the speed either by means of a analog device, such as a meter, or a digital device, such as a multiple digital display devices.

When a police officer is on his regular duty in his vehicle, he usually has a number of different tasks to perform. For example, he must be alert to finding hazards along the road. He must drive his vehicle properly. He must check various numbers and reports concerning stolen automobiles and the like. In addition, he is trying to identify any vehicles which are traveling at excessive speed. With all these tasks to be performed concurrently, it is not possible for him to constantly monitor the results being displayed visually by the radar speed detector, especially if he is travelling along the road. Thus, many persons who ought to be apprehended may escape detection.

Therefore, it is an object of this invention to simplify the process for monitoring vehicle speed using a radar speed detector.

Another object of this invention is to simplify the monitoring of vehicle speed using a radar speed detector that is mounted in another moving vehicle.

Another object of this invention is to provide an oral announcement of the vehicle speed based upon measurements by a radar speed detector.

SUMMARY

In accordance with our invention, we convert signals from a radar speed detector that represent the digits of measured vehicle speed into signals representing the individual digits of speed in sequence. For example, if the measured speed is 65 miles per hour, the signals from the radar speed detector are converted into signals representing SIX-FIVE in sequence. A speech synthesizer generates modulated audio signals in response to this sequence and a speaker broadcasts the numbers. In the foregoing example the operator hears the speed as "SIX-FIVE".

This invention is pointed out with particularity in the appended claims. The above and further objects and advantages of this invention may be better understood by referring to the following detailed description taken in conjunction with the accompanying drawings.

DESCRIPTION OF AN ILLUSTRATIVE EMBODIMENT

Figure 1:
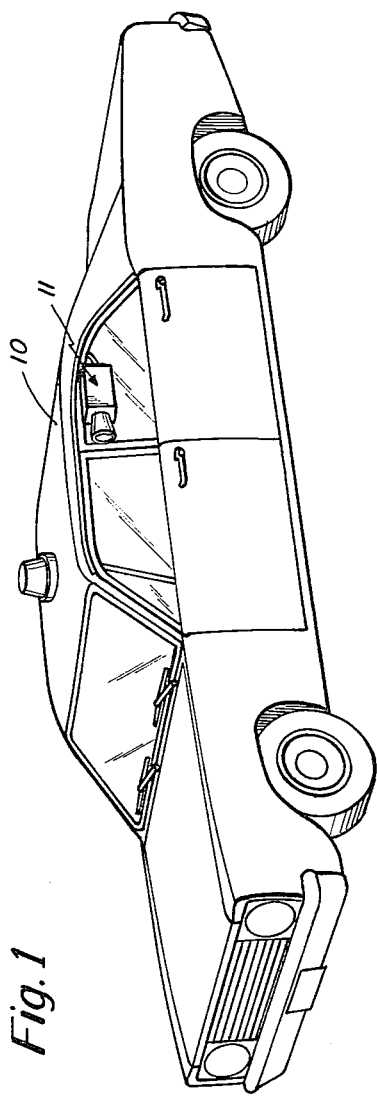
FIG. 1 is a perspective view of a police vehicle carrying a radar speed detector.

A police vehicle 10, or like vehicle, shown in FIG. 1 can be equipped to measure vehicle speed. Generally such a vehicle contains antenna element 11 which is part of a conventional radar unit 12 shown in FIG. 2. The antenna element 11 may be located on the exterior of the vehicle 10 as shown in FIG. 1 or in its interior. Moreover, the radar unit 12, shown in FIG. 2, may be either of the type which operates when the police vehicle 10 is stationary or moving.

Figure 2:
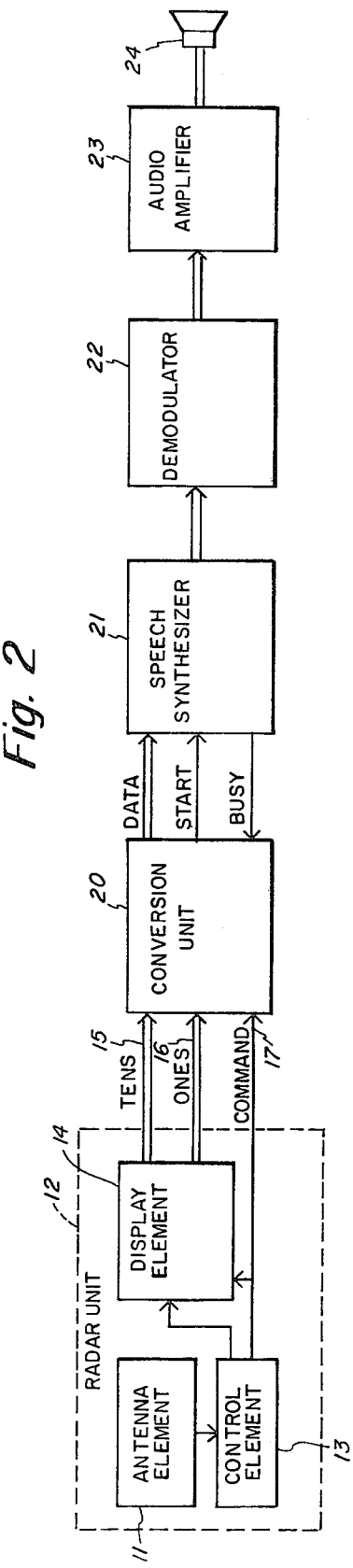
FIG. 2 is a block diagram of the electrical circuit that is associated with the radar speed detector unit shown in FIG. 1 and that is constructed in accordance with this invention.

Referring to FIG. 2, the radar unit 12 contains three basic elements including the previously mentioned antenna element 11. Signals from the antenna element 11 energize a control element 13 that provides display information to a display element 14. Generally the control element 13 includes circuitry for measuring time intervals that directly correlate with speed readings. The display element 14 will generally include a multi-digit digital display which responds to binary-coded-decimal (BCD) signals; in this particular example, a two-digit display is used having a tens digit and a ones digit. Signals are fed into the display element 14 in response to a COMMAND signal from the control element 13 which is generated each time a measurement has been completed.

In accordance with this invention, the signals generated by the radar unit 12 produce an oral announcement of vehicle speed. This announcement can be used alone or in conjunction with a standard visual indication. Specifically, we obtain the BCD signals for each digit from the display element 14. In this particular embodiment they are represented as TENS signals on conductors 15 and ONES signals on conductors 16. A conductor 17 carries the COMMAND signal. All these signals are utilized by a conversion unit 20 which produces DATA signals and a START signal. The conversion unit 20 presents the TENS signals and the ONES signals in sequence to a data input of a speech synthesizer 21. Each time new data signals appear, the conversion unit 20 generates a START signal to initiate a synthesizing operation. The speech synthesizer 21 also produces a BUSY signal which is fed back to the conversion unit 20.

The speech synthesizer 21 is a conventional unit which produces a modulated audio frequency output signal. One such speech synthesizer is a TSI Standard Speech Synthesizer Circuit Board manufactured by Telesensory Systems, Inc. of Palo Alto, California. The modulated audio frequency signals are then coupled through a demodulator 22 and audio amplifier 23 to energize a speaker 24. The signals from the display element 14 thereby are converted to an oral announcement of the vehicle speed that is broadcast by the speaker 24. More specifically, if the measured vehicle speed is 65 miles per hour, the radar unit 12 will produce signals corresponding to number six on the TENS conductor 15 and five on the ONES conductor 16. The conversion unit 20 first generates the signals representing six on the data conductors with a START signal, enabling speech synthesizer 21 to produce the modulated audio frequency signals so the speaker 24 orally broadcasts "SIX". Then the conversion unit 20 couples the signals on the ONES conductor 16 representing the numeral five to the speech synthesizer 21 thereby to broadcast the number FIVE. The operator hears the announcement "SIX-FIVE" from the radar unit and need not view the display element 14.

The radar unit 12, speech synthesizer 21, demodulator 22, audio amplifier 23 and speaker 24 are all constituted by conventional elements. Therefore, no further discussion of their operation or details of their constructions is necessary.

Figure 3:
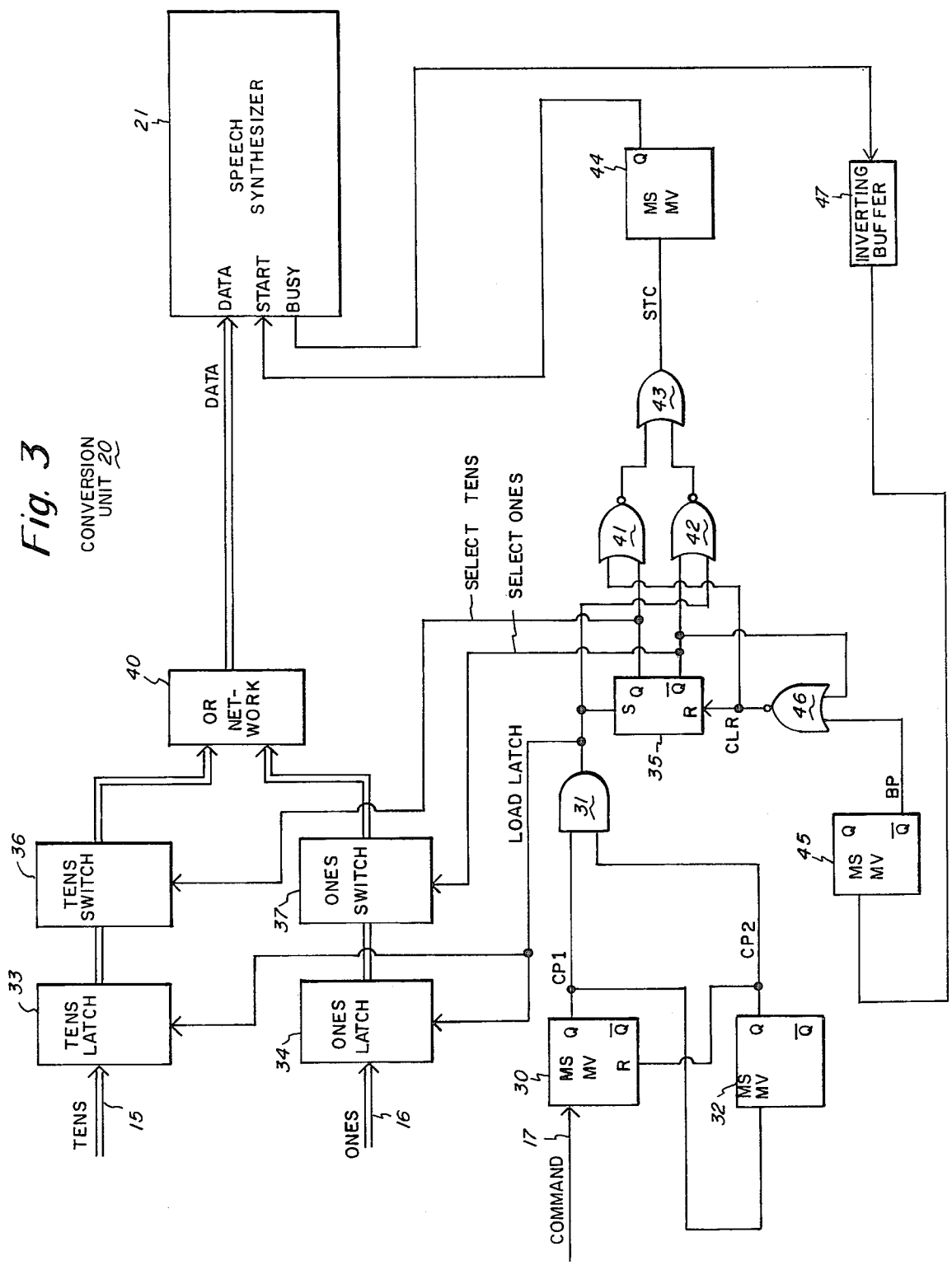
FIG. 3 is a detailed block diagram of a conversion unit shown in FIG. 2.
Figure 4:
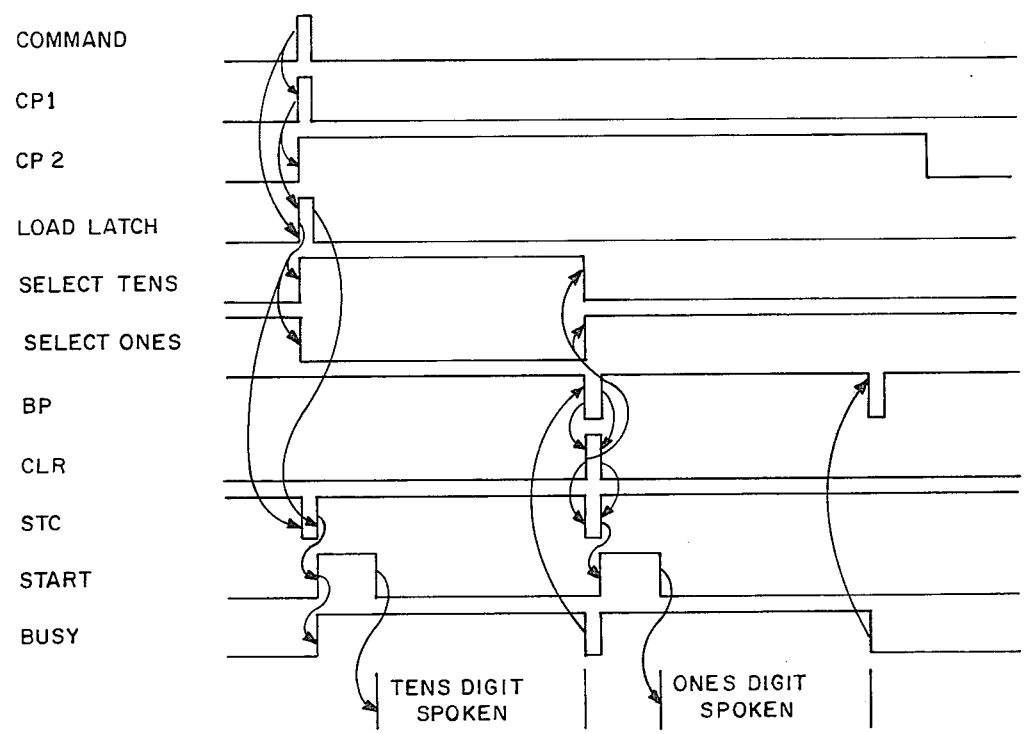
FIG. 4 is a timing diagram that illustrates the relationship of various signals in the circuit shown in FIG. 3.

The conversion unit 20 is shown in detail in FIG. 3 and a timing chart illustrating the timing relationships of the various signals in the circuitry shown in FIG. 3 is presented in FIG. 4. As previously indicated, each time the display element 14 receives new information, the control element 13 in FIG. 2 generates a COMMAND pulse on conductor 17. At this time signals are present on the TENS conductors 15 and the ONES conductors 16. The leading edge of the COMMAND pulse triggers a retriggerable monostable multivibrator 30 thereby to shift the CP1 signal to a asserted level. The CP1 signal, when asserted, enables an AND gate 31 and triggers another retriggerable monostable multivibrator 32. The timing circuitry associated with the monostable multivibrator 32 produces a CP2 pulse of an interval that exceeds the time necessary to produce the complete oral speed announcement thereby to prevent overlapped announcements.

The leading edge of the CP2 pulse energizes the AND gate 31 and also clears or resets the multivibrator 30 thereby terminating the CP1 pulse. As a result, the AND gate 31 produces a LOAD LATCH pulse. The leading edge of the LOAD LATCH pulse transfers the information on the TENS conductor 15 and ONES conductor 16 into a TENS latch 33 and a ONES latch 34 respectively. The LOAD LATCH pulse also sets a flip-flop, or latch, 35 thereby to shift a SELECT TENS signal to an asserted state and a SELECT ONES signal to a non-asserted state. When the SELECT TENS signal is asserted, it closes a TENS switch 36. The SELECT ONES signal, in a non-asserted state, opens a ONES switch 37. Thus, an OR network 40 conveys the TENS signal from the TENS latch 33 to the data input of the speech synthesizer 21 as data signals.

The LOAD LATCH pulse also controls circuitry including NOR gates 41 and 42, an OR gate 43 and a retriggerable monostable multivibrator 44. This circuitry also is controlled by signals from the flip-flop 35, another retriggerable monostable multivibrator 45 and a NOR gate 46. More specifically, before the LOAD LATCH pulse is generated, the monostable multivibrator 45 is cleared, so a BP signal energizes the NOR gate 46 and shifts a CLR signal to a non-asserted state. The latch 35 also is cleared so the NOR gate 41 and the AND gate 31 maintain an STC signal at a positive, or asserted, level. At the same time, both the SELECT ONES signal and the latch 35 condition the NOR gate 42 so its output signal is at a low, or non-asserted, level. The leading edge of the LOAD LATCH pulse sets the flip-flop 35, so the NOR gate 41 is de-energized and the STC signal shifts to a non-asserted state. However, the monostable multivibrator 44 is not triggered until the trailing edge of the LOAD LATCH pulse when the STC signal shifts back to a positive state. When the monostable multivibrator 44 is triggered, it produces a START pulse having a fixed duration.

On the leading edge of the START pulse the speech synthesizer produces a BUSY signal that is fed through an inverting buffer 47 to the monostable multivibrator 45. However, the assertion of the BUSY signal does not trigger the monostable multivibrator 45. On the trailing edge of the START signal from the monostable multivibrator 44, the speech synthesizer 21 produces the modulated audio signals corresponding to the input signals, namely the TENS digit.

Once the oral digit has been synthesized, the speech synthesizer 21 terminates the BUSY signal. Now the monostable multivibrator 45 is triggered to generate a negative-going BP pulse. Both inputs to the NOR gate 46 thereby are shifted to a non-asserted state so the NOR gate 46 produces the CLR pulse, which is coextensive with the BP pulse. The CLR pulse shifts the STC signal back to a non-asserted state and clears the flip-flop 35. The TENS switch 36 thereby is opened while the ONES switch 37 is closed, so the signals representing the ONES digit appear at the data input of the speech synthesizer 21.

When the flip-flop 35 has been cleared and the CLR signal has terminated, the NOR gate 41 energizes the OR gate 43 and shifts the STC signal back to a positive state thereby triggering the monostable multivibrator 44 and initiating another synthesizing operation. When the BUSY signal terminates after the second digit is announced, the monostable multivibrator 45 again produces another negative-going BP signal. However, the flip-flop 35 provides an overriding input signal to the NOR gate 46, so the CLR pulse is inhibited. Once this operation is completed, the monostable multivibrator 32 times out and removes the overriding signal to the monostable multivibrator 30. Thus, a COMMAND signal on conductor 17 can begin another announcement.

In summary, we have shown a specific embodiment of apparatus for and a method for converting signals from a radar speed detector into an oral announcement that can be used as a sole indication of vehicle speed or in conjunction with the normal visual display. It will be apparent that this specific embodiment is representative of a number of circuits that could perform this function. Thus, it is the intent of the appended claims to cover all such variations and modifications as come within the true spirit and scope of this invention.

What we claim as new and desire to secure by Letters Patent of the United States is:

1. Apparatus for producing an oral announcement of the speed of the vehicle including:
    A. measuring means for generating a control signal and concurrent first and second parallel speed signals that correspond to first and second speed digits representing vehicle speed in response to a radar measurement of the vehicle speed,
    B. conversion means connected to said measuring means for generating audio information signals containing audio information in response to the control and the first and second speed signals,
    C. transducer means connected to said conversion means for generating an oral announcement of vehicle speed in response to the audio information signals.

2. Apparatus as recited in claim 1 wherein said conversion means includes:

(i) signal translating means connected to said measuring means for generating a timed sequence of speed signals and starting control signals in response to the speed signals for the first and second speed digits and the control signal from said measuring means; and (ii) speech synthesizing means connected to said signal translating means for generating modulated audio signals in response to the timed sequence of speed signals and starting signals, the modulated audio signals being conveyed to said transducer means.

3. Apparatus as recited in claim 2 wherein said transducer means includes:

(i) demodulator means for generating audio signals in response to the modulated audio signals from said speech synthesizer means, (ii) amplifier means connected to said demodulator means for generating an output signal in response to the audio signals, and (iii) speaker means connected to said amplifier means for producing the oral announcement of vehicle speed in response to the output signals from said amplifier means.

4. Apparatus as recited in claim 2 wherein said signal translating means includes:

A. first latching means for receiving the first speed digit,

B. second latching means for receiving the second speed digit,

C. latch timing means responsive to said control signal for loading the first and second speed digits into said first and second latching means, D. switching means connected to said first and second latching means and said conversion means, and E. switch timing means responsive to said latch timing means for generating the starting control signal and for selectively coupling said first and second latching means to said conversion means through said switching means in sequence.

5. A method for orally announcing vehicle speed, said method comprising the steps of:

A. generating, with a radar speed detector means, first signals representing vehicle speed and including first and second sets of signals representing, respectively, first and second speed digits in parallel, B. converting the first and second sets of signals into a sequence of digit signals corresponding to said first and second digits in sequence, C. converting the sequence of digit signals into audio signals; and D. producing, in response to the audio signals, the oral announcement of vehicle speed.

6. A method as recited in claim 5 wherein the first signals are constituted by binary signals in parallel, said first converting step including converting the binary signals in parallel into binary-coded-decimal digit signals for each digit in the timed sequence and said second converting step including converting the sequence of digit signals into modulated audio signals.

7. A method as recited in claim 6 wherein the oral announcement step includes converting the modulated audio signals into the oral announcement.

* * * * *